No. 715,059. Patented Dec. 2, 1902.
J. G. HAGLOCK.
BANDAGE FOR RACE HORSES.
(Application filed Dec. 30, 1901.)
(No Model.)
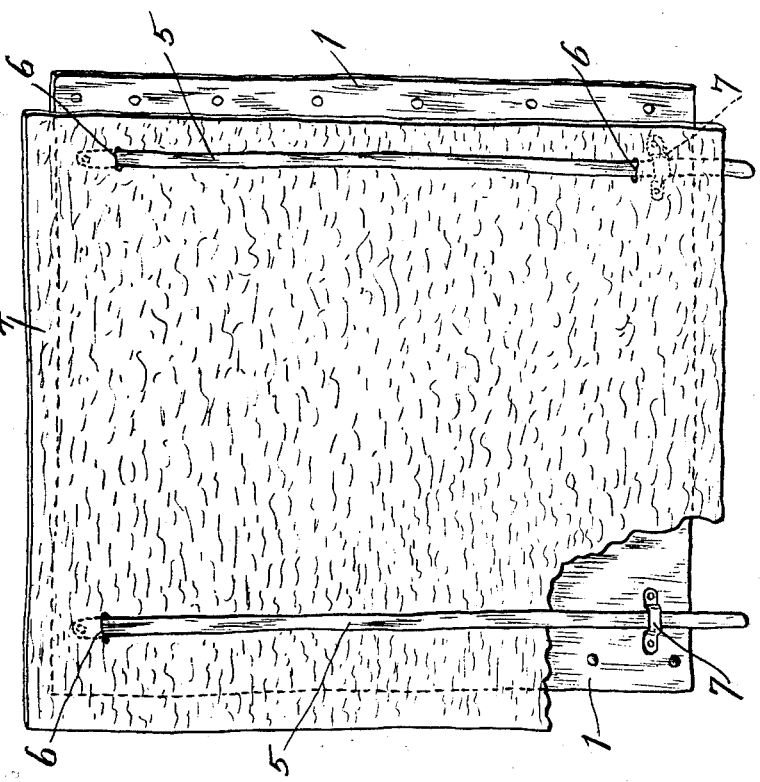
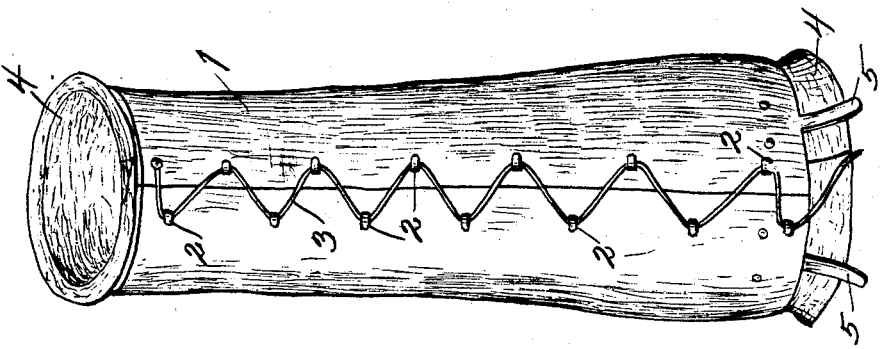
Witnesses:
R. J. Jackter
W. F. Palmer
Inventor:
John G. Haglock,
By Walter N. Haskell,
Atty.

UNITED STATES PATENT OFFICE.

JOHN G. HAGLOCK, OF STERLING, ILLINOIS.

BANDAGE FOR RACE-HORSES.

SPECIFICATION forming part of Letters Patent No. 715,059, dated December 2, 1902.

Application filed December 30, 1901. Serial No. 87,671. (No model.)

*To all whom it may concern:*

Be it known that I, JOHN G. HAGLOCK, a citizen of the United States, residing at Sterling, in the county of Whiteside and State of Illinois, have invented certain new and useful Improvements in Bandages for Race-Horses; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to bandages for race-horses, being designed to protect the lower portions of the animal's limbs while standing in the stable after racing.

After completing the heats of a race there is less circulation of the blood in the extremities, and unless precautions are taken puffs will appear on the lower portions or shanks of the animal's limbs and the tendons become drawn or "filled in." Heretofore to provide against this condition and induce circulation in the lower part of the animal's limbs it has been customary to wrap the shanks of the horse after completing a race in cotton, binding the same on with strips of cloth. Some time was necessarily consumed in applying and removing these bandages.

In my device I seek to provide a bandage of cotton or similar material and retain the same in position with a jacket or holder which can be easily and quickly attached to the horse's limbs and removed therefrom. I also secure the pad detachably to the holder by simple means, so that the same can be changed when desired. At the same time the attachment of the pad to the holder prevents the misplacing of the former when the holder is removed from the horse's limbs and possibly thrown to one side in the stable.

In the drawings, Figure 1 is a view of my device in perspective, showing the same as it appears when in position on the horse's leg. Fig. 2 is a view of the same detached and open, the inside of the pad being to the front and one corner thereof broken away.

1 is a jacket or holder provided with hooks 2 and lacing 3, whereby the same is fastened in position on the shank of the horse's leg.

4 is a pad of desired thickness, formed of cotton or some other absorbent material, such pad being secured to the holder 1 by means of two or more tape strings 5. The strings 5 are secured at their upper ends to the holder 1, passing through slits 6 6 in the pad 4, and are fastened at their lower ends to the jacket by means of keepers 7. It is apparent that by this arrangement the pad can easily be replaced.

Other methods of securing the jacket in position on the horse's limb may be employed; but by reason of the expedition with which a lacing similar to that shown in the drawings can be laced up and unlaced there is a decided advantage in the employment of that style of fastening.

The pad 4 is slightly longer than the jacket 1, that its ends may project beyond the ends of said jacket and prevent rubbing and chafing of the horse's ankles or shanks by the jacket. The pad and jacket are of about the same width, but are so placed with relation to each other that at one side the jacket extends beyond the pad and at the other side the pad extends beyond the jacket. This is done in order that when in place the joint between the edges of the pad will not register with the joint between the edges of the jacket, but will produce what is known as a "break-joint" connection.

What I claim as my invention, and desire to secure by Letters Patent of the United States, is—

1. In a horse-bandage, the combination of a jacket, a series of hooks arranged near the meeting edges of said jacket, means engaging said hooks to retain said jacket in a closed position, tape strings secured to the inner face of said jacket, a pad through which extend said tape strings, keepers secured to the inner face of said jacket to receive the ends of said tape strings, all parts being arranged sustantially as described.

2. In a horse-bandage, the combination of a jacket, tape strings and keepers attached to the inner face of said jacket, and a pad having slits formed therein through which said tape strings extend, substantially as described.

In testimony whereof I affix my signature in presence of two witnesses.

JOHN G. HAGLOCK.

Witnesses:
   JOS. KORN,
   F. A. GOULD.